(12) United States Patent
Wang

(10) Patent No.: US 12,004,082 B2
(45) Date of Patent: Jun. 4, 2024

(54) METHOD FOR DETERMINING BETTER POWER CONSUMPTION FOR ANTENNA PANELS

(71) Applicant: BEIJING UNISOC COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 368 days.

(21) Appl. No.: 17/289,687

(22) PCT Filed: Oct. 14, 2019

(86) PCT No.: PCT/CN2019/110942
§ 371 (c)(1),
(2) Date: Jan. 27, 2022

(87) PCT Pub. No.: WO2020/088225
PCT Pub. Date: May 7, 2020

(65) Prior Publication Data
US 2022/0167274 A1    May 26, 2022

(30) Foreign Application Priority Data
Nov. 1, 2018   (CN) .......................... 201811294993.2

(51) Int. Cl.
*H04W 52/02*   (2009.01)
*H04L 5/00*    (2006.01)

(52) U.S. Cl.
CPC ....... *H04W 52/0235* (2013.01); *H04L 5/0051* (2013.01); *H04L 5/0064* (2013.01)

(58) Field of Classification Search
CPC . H04W 52/0235; H04W 24/10; H04W 52/02; H04W 52/0212; H04W 72/04;
(Continued)

(56) References Cited

U.S. PATENT DOCUMENTS

| 9,425,878 B2 | 8/2016 | Molnar et al. |
| 2008/0051037 A1 | 2/2008 | Molnar et al. |

(Continued)

FOREIGN PATENT DOCUMENTS

| CN | 101345566 A | 1/2009 |
| CN | 101803230 A | 8/2010 |

(Continued)

OTHER PUBLICATIONS

Office Action dated Jun. 20, 2022, in corresponding Japanese Application No. 2021-523297.

(Continued)

*Primary Examiner* — Ian N Moore
*Assistant Examiner* — Latresa A McCallum
(74) *Attorney, Agent, or Firm* — Harness, Dickey & Pierce, P.L.C.

(57) ABSTRACT

An antenna panel determination method, a user terminal and a computer readable storage medium. The method comprises: reporting measurement information to a base station, the measurement information comprising downlink measurement results corresponding to N antenna panels, wherein N is the total number of configured antenna panels, and N≥2; receiving instruction information issued by the base station, the indication information being obtained by the base station according to the measurement information and an uplink measurement result; obtaining, from within the instruction information, an antenna panel that is used for transmission and indicated by the base station; and using the antenna panel that is used for transmission to perform
(Continued)

transmission. The solution above may reduce the power consumption of the user terminal.

12 Claims, 2 Drawing Sheets

(58) Field of Classification Search
CPC ..... H04W 72/12; H04W 72/21; H04W 72/23; H04L 5/0051; H04L 5/0064; H04L 5/0048; H04L 5/0023; Y02D 30/70
See application file for complete search history.

(56) References Cited

U.S. PATENT DOCUMENTS

| | | |
|---|---|---|
| 2009/0016312 A1 | 1/2009 | Tao et al. |
| 2013/0201946 A1 | 8/2013 | Lunttila et al. |
| 2014/0023033 A1 | 1/2014 | Chun et al. |
| 2014/0219190 A1 | 8/2014 | Molnar et al. |
| 2018/0048375 A1 | 2/2018 | Guo et al. |
| 2019/0014588 A1 * | 1/2019 | Kishiyama ............ H04L 5/0051 |
| 2019/0207657 A1 | 7/2019 | Cao |
| 2019/0342766 A1 | 11/2019 | Yanagisawa et al. |
| 2020/0014448 A1 | 1/2020 | Osawa et al. |
| 2020/0028547 A1 | 1/2020 | Gao et al. |
| 2020/0036425 A1 | 1/2020 | Ren et al. |
| 2021/0120536 A1 | 4/2021 | Gao et al. |

FOREIGN PATENT DOCUMENTS

| | | | | |
|---|---|---|---|---|
| CN | 107579764 A | 1/2018 | | |
| CN | 108631831 A | 10/2018 | | |
| CN | 108633006 A | 10/2018 | | |
| CN | 108667496 A | 10/2018 | | |
| EP | 3487203 A1 * | 5/2019 | ............ | H04W 16/28 |
| EP | 3585116 A1 * | 12/2019 | ........... | H04B 17/309 |
| WO | 2018031291 A1 | 2/2018 | | |
| WO | WO-2018095168 A1 | 5/2018 | | |
| WO | 2018128048 A1 | 7/2018 | | |
| WO | 2018166345 A1 | 9/2018 | | |
| WO | 2018171786 A1 | 9/2018 | | |
| WO | 2018173163 A1 | 9/2018 | | |

OTHER PUBLICATIONS

Office Action dated Jun. 28, 2022, in corresponding Korean Application No. 10-2021-7016230.
Second Office Action dated May 12, 2022, in corresponding Chinese Application No. 201811294993.2.
Xiaomi, R1-1811393, Enhancements on beam management, 3GPP TSG RAN WG1 #94bis, 3GPP server publication date (Sep. 29, 2018).
First Chinese Office Action regarding Application No. 201811294993.2 dated Nov. 1, 2021. English translation provided by Unitalen Attorneys at Law.
International Search Report (English and Chinese) and Written Opinion (Chinese) of the International Searching Authority issued in PCT/CN2019/110942, dated Jan. 15, 2020; ISA/CN (8 pages).

* cited by examiner

METHOD FOR DETERMINING BETTER POWER CONSUMPTION FOR ANTENNA PANELS

CROSS-REFERENCE TO RELATED APPLICATIONS

This application is the national phase of International Application No. PCT/CN2019/110942, filed on Oct. 14, 2019, and claims the benefit of priority to Chinese Patent Application No. 201811294993.2, filed on Nov. 1, 2018, and entitled "ANTENNA PANEL DETERMINATION METHOD, USER TERMINAL AND COMPUTER READABLE STORAGE MEDIUM", the entire disclosures of each of the above applications are incorporated herein by reference.

TECHNICAL FIELD

The present disclosure generally relates to wireless communication technology field, and more particularly, to an antenna panel determination method, a user terminal and a computer readable storage medium.

BACKGROUND

In a New Radio (NR) R15 system, a user terminal selects a corresponding downlink antenna panel according to a wireless channel state thereof for receiving data. A base station configures an uplink antenna panel for the user terminal to send data.

In prior art, the uplink antenna panel may be inconsistent with the downlink antenna panel. When the user terminal corresponds to multiple antenna panels, each antenna panel needs to send data or receive data from the base station, resulting in high power consumption of the user terminal.

SUMMARY

Embodiments of the present disclosure may achieve a better power consumption reduction of the user terminal.

In an embodiment of the present disclosure, an antenna panel determination method is provided, including: reporting a measurement information to a base station, wherein the measurement information includes downlink measurement results corresponding to N antenna panels, where N is a total number of configured antenna panels, and N≥2; receiving an indication information sent by the base station, where the indication information is obtained by the base station according to the measurement information and uplink measurement results; obtaining, from the indication information, an antenna panel that is used for transmission and indicated by the base station; and using the antenna panel that is used for transmission and indicated by the base station to perform transmission.

Optionally, obtaining, from the indication information, an antenna panel used for transmission and indicated by the base station includes: obtaining a sounding reference signal resource set identifier from the indication information; and determining the antenna panel used for transmission and indicated by the base station according to the sounding reference signal resource set identifier.

Optionally, determining the antenna panel used for transmission and indicated by the base station according to the sounding reference signal resource set identifier includes: determining the antenna panel used for transmission and indicated by the base station according to a following formula: panel ID=(SRS source set ID) mod N, wherein the panel ID is an identifier of the antenna panel used for transmission and indicated by the base station, and the SRS source set ID is the sounding reference signal resource set identifier.

Optionally, in the measurement information, the downlink measurement results corresponding to the N antenna panels are arranged in a preset order.

Optionally, in the measurement information, antenna panels corresponding to message 1 or message 3 are arranged in a first place of the downlink measurement results corresponding to the N antenna panels.

Optionally, reporting a measurement information to a base station includes: when a size of the measurement information exceeds a size of a bearer resource set correspondingly, determining downlink measurement results corresponding to first M antenna panels with a highest priority according to the size of the bearer resource and reporting the downlink measurement results corresponding to the first M antenna panels to the base station.

In an embodiment of the present disclosure, a user terminal is provided, including: a reporting unit, adapted to report a measurement information to a base station, wherein the measurement information includes downlink measurement results corresponding to N antenna panels, where N is a total number of configured antenna panels, and N≥2; a receiving unit, adapted to receive an indication information sent by the base station, where the indication information is obtained by the base station according to the measurement information and uplink measurement results; an obtaining unit, adapted to obtain, from the indication information, an antenna panel used for transmission and indicated by the base station; and a transmitting unit, adapted to use the antenna panel used for transmission to perform transmission.

Optionally, the obtaining unit is adapted to obtain a sounding reference signal resource set identifier from the indication information, and to determine the antenna panel used for transmission and indicated by the base station according to the sounding reference signal resource set identifier.

Optionally, the obtaining unit is adapted to determine the antenna panel used for transmission and indicated by the base station according to a following formula: panel ID= (SRS source set ID) mod N, wherein the panel ID is an identifier of the antenna panel used for transmission and indicated by the base station, and the SRS source set ID is the sounding reference signal resource set identifier.

Optionally, in the measurement information, the downlink measurement results corresponding to the N antenna panels are arranged in a preset order.

Optionally, in the measurement information, antenna panels corresponding to message 1 or message 3 are arranged in a first place of the downlink measurement results corresponding to the N antenna panels.

Optionally, the reporting unit is further adapted to, when a size of the measurement information exceeds a size of a bearer resource set correspondingly, determine downlink measurement results corresponding to first M antenna panels with a highest priority according to the size of the bearer resource and report the downlink measurement results corresponding to the first M antenna panels to the base station.

In an embodiment of the present disclosure, a computer readable storage medium having computer instructions stored therein is provided, wherein the computer readable storage medium is a non-volatile storage medium or a non-transitory storage medium, and once the computer instructions are executed, the above antenna panel determination method is performed.

In an embodiment of the present disclosure, a user terminal including a memory and a processor is provided, wherein the memory has computer instructions stored therein, and when the processor executes the computer instructions, the above antenna panel determination method is performed.

Embodiments of the present disclosure may provide following advantages.

In embodiments of the present disclosure, the downlink measurement results corresponding to the N antenna panels are reported to the base station. The base station determines the antenna panel used for transmission by the user terminal user according to the downlink measurement results and the uplink measurement results corresponding to the N antenna panels, and indicates the antenna panel used for transmission to the user terminal through the indication information. In a transmission process, the user terminal transmits data through the antenna panel indicated by the indication information, and other antenna panels of the user terminal do not participate, so that the power consumption of the user terminal can be effectively reduced.

DETAILED DESCRIPTION

As described in background, in prior art, an uplink antenna panel may be inconsistent with a downlink antenna panel. When a user terminal corresponds to multiple antenna panels, each antenna panel needs to send data or receive data from a base station, resulting in high power consumption of the user terminal.

For example, when the user terminal corresponds to two antenna panels, both the two antenna panels need to be in working mode and receive data sent by the base station. Therefore, the power consumption of the user terminal is relatively high.

In embodiments of the present disclosure, downlink measurement results corresponding to N antenna panels is reported to a base station. The base station determines an antenna panel used for transmission by a user terminal according to the downlink measurement results corresponding to the N antenna panels and uplink measurement results, and indicates the user terminal through an indication information. In a transmission process, the user terminal uses the antenna panel used for transmission and indicated by the indication information to perform transmission, and other antenna panels of the user terminal do not participate in the transmission process, so that power consumption of the user terminal can be effectively reduced.

In order to clarify the object, characteristic and advantages of embodiments of the present disclosure, embodiments of present disclosure will be described clearly in detail in conjunction with accompanying drawings.

Figure 1:
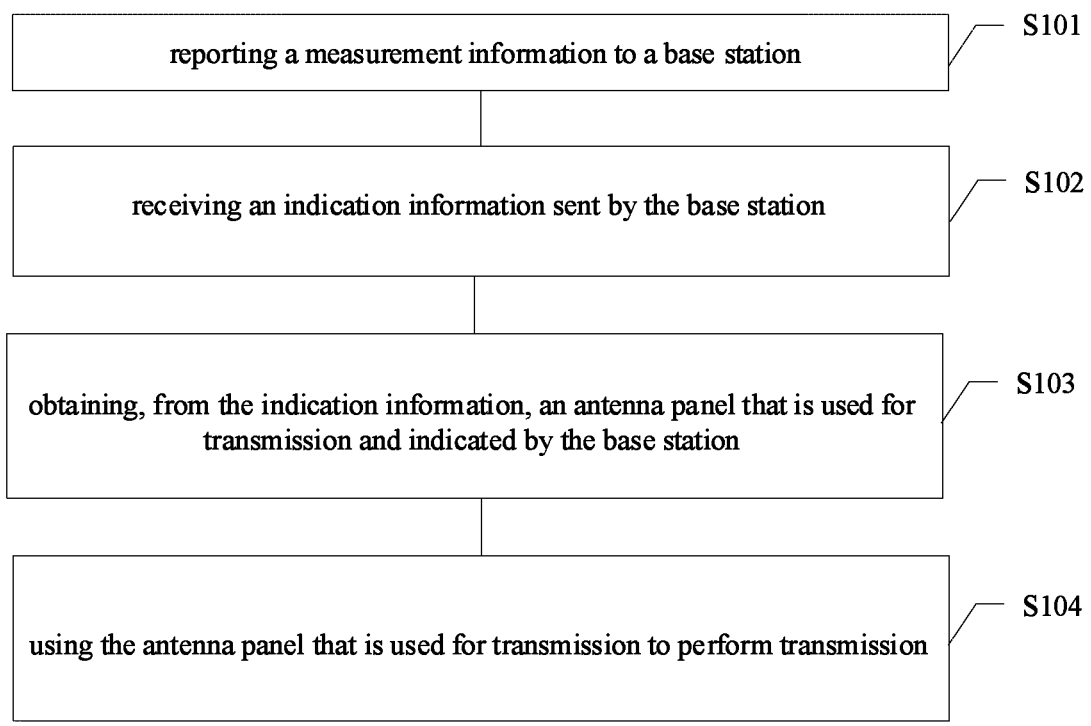
FIG. 1 schematically illustrates a flow chart of an antenna panel determination method according to an embodiment.

Referring to FIG. 1, FIG. 1 schematically illustrates a flow chart of an antenna panel determination method according to an embodiment.

In S101, a measurement information is reported to a base station.

In some embodiments, the measurement information reported by a user terminal to the base station may include downlink measurement results corresponding to N antenna panels, where N is a total number of antenna panels configured by the user terminal, and N is a positive integer and N≥2.

For example, a total number of antenna panels configured by a user terminal A is N=2, which are antenna panel 1 and antenna panel 2, respectively. For the user terminal A, the measurement information reported to the base station includes a downlink measurement result corresponding to the antenna panel 1 and a downlink measurement result corresponding to the antenna panel 2.

For another example, a total number of antenna panels configured by a user terminal B is N=4, which are antenna panel 1, antenna panel 2, antenna panel 3, and antenna panel 4, respectively. The measurement information reported by the user terminal B to the base station includes a downlink measurement result corresponding to antenna panel 1, a downlink measurement result corresponding to antenna panel 2, a downlink measurement result corresponding to antenna panel 3, and a downlink measurement result corresponding to antenna panel 4.

In some embodiments, a downlink measurement result corresponding to each antenna panel obtained by the user terminal may be a Channel State Information (CSI) corresponding to each antenna panel. Those skilled in the art can understand that the calculation process and principles of obtaining the downlink measurement result corresponding to each antenna panel may refer to prior art, which will not be described in detail here.

In some embodiments, before reporting the measurement information to the base station, the user terminal may arrange the downlink measurement results corresponding to the N antenna panels in a preset order. In an embodiment, antenna panels corresponding to message 1 or message 3 may be arranged in a first place of the downlink measurement results corresponding to the N antenna panels.

By arranging the antenna panels corresponding to message 1 or message 3 in the first place of the downlink measurement results corresponding to the N antenna panels, the robustness of a system can be improved.

In S102, an indication information sent by the base station is received.

In some embodiments, after receiving the measurement information reported by the user terminal, the base station may perform uplink training on each antenna panel of the user terminal to obtain uplink measurement results corresponding to the N antenna panels. The base station may select an antenna panel that meets the performance requirements of a communication system according to the uplink measurement results corresponding to the N antenna panels and the downlink measurement results corresponding to the N antenna panels. After obtaining the antenna panel that meets the performance requirements of the communication system, the base station may send the indication information to the user terminal. In the indication information, an identifier of the antenna panel that is used for transmission can be indicated to the user terminal.

In some embodiments, the antenna panel, that is selected by the base station and meets the performance requirements of the communication system, has corresponding performance parameters meet requirements of both the uplink transmission and the downlink transmission.

In some embodiments, when the base station detects that multiple antenna panels meet the performance requirements of the communication system based on the uplink measurement results corresponding to the N antenna panels and the downlink measurement results corresponding to the N antenna panels, the base station may select one from the multiple antenna panels that meet the performance requirements of the communication system and send the indication information to the user terminal.

In some embodiments, when the base station detects that multiple antenna panels meet the performance requirements of the communication system, the base station may select an antenna panel with a best uplink performance and a best downlink performance from the multiple antenna panels, and indicate the user terminal to use the selected antenna panel for transmission.

For example, the base station detects that both antenna panel 1 and antenna panel 2 meet the performance requirements of the communication system, and an uplink performance of the antenna panel 1 is better than that of the antenna panel 2, and a downlink performance of the antenna panel 1 is better than that of the antenna panel 2. Therefore, the base station selects the antenna panel 1 and indicates the user terminal to use the antenna panel 1 for transmission.

Specifically, when the base station detects that multiple antenna panels meet the performance requirements of the communication system, and there is no antenna panel with the best uplink performance and the best downlink performance, the base station may select an antenna panel with the best uplink performance or the best downlink performance, or select an antenna panel with a most balanced uplink performance and downlink performance. Those skilled in the art can understand that when the base station detects that multiple antenna panels meet the performance requirements of the communication system, the base station may also use other rules to select an antenna panel from the multiple antenna panels, which will not be described in detail here.

In some embodiments, when the base station cannot detect an antenna panel that meets the performance requirements of the communication system according to the uplink measurement results corresponding to the N antenna panels and the downlink measurement results corresponding to the N antenna panels, the base station may indicate the user terminal of an antenna panel used for uplink transmission and an antenna panel used for downlink transmission. In this case, the antenna panel used for uplink transmission and the antenna panel used for downlink transmission are different.

In some embodiments, the base station may send the indication information to the user terminal through a Downlink Control Information (DCI). The user terminal may receive the DCI sent by the base station and obtain the indication information thereof.

Specifically, the base station may indicate the antenna panel used for transmission to the user terminal through the indication information explicitly or implicitly.

In some embodiments, the indication information may carry an identifier of the antenna panel used for transmission, so as to explicitly indicate the antenna panel used for transmission to the user terminal. The indication information may also carry a Sounding Reference Signal (SRS) source set ID, and the SRS source set ID is used to indicate the antenna panel used for transmission to the user terminal.

In S103, the antenna panel used for transmission and indicated by the base station is obtained from the indication information.

In some embodiments, the user terminal may obtain the antenna panel that is used for transmission and indicated by the base station from the indication information.

In some embodiments, the antenna panel used for transmission may be used for transmitting an uplink data or a downlink data, or may also be used for transmitting a control information, etc.

In some embodiments, the base station may set the SRS source set ID in the indication information, and indicate the antenna panel used for transmission to the user terminal through the SRS source set ID. The user terminal may receive the indication information sent by the base station and obtain the SRS source set ID from the indication information. According to the SRS source set ID, the user terminal may determine the antenna panel used for transmission indicated by the base station.

In some embodiments, both on the base station side and the user terminal side, mapping relationships between SRS source set IDs and antenna panels may be preset, and the base station and the user terminal follow a same mapping relationship between the SRS source set IDs and the antenna panels. In an uplink training process, the user terminal may send SRS resources according to the preset mapping relationship. The base station may set an SRS source set ID in the indication information according to the preset mapping relationship, so as to indicate a corresponding antenna panel used for transmission to the user terminal.

After obtaining the SRS source set ID, the user terminal may obtain the antenna panel used for transmission corresponding to the SRS source set ID according to the mapping relationship between the SRS source set IDs and the antenna panels, where the mapping relationship between the SRS source set IDs and the antenna panels is also applied to the uplink training.

In some embodiments, the user terminal may use the following formula to determine the antenna panel used for transmission and indicated by the base station:

$$\text{panel ID} = (\text{SRS source set ID}) \bmod N;$$

Specifically, the panel ID is an identifier of the antenna panel that is used for transmission and indicated by the base station, and (SRS source set ID) mod N is SRS source set ID modulo N.

In S104, the antenna panel used for transmission is used to perform transmission.

In some embodiments, after obtaining the antenna panel used for transmission and indicated by the base station, the user terminal may use the antenna panel indicated by the base station to perform transmission, and close other antenna panels.

For example, the base station indicates a user terminal A to use antenna panel 1 for data transmission, and antenna panels corresponding to the user terminal A include the antenna panel 1 and an antenna panel 2. The user terminal selects the antenna panel 1 for data transmission and closes the antenna panel 2, thereby reducing power consumption.

Therefore, during a transmission process, the user terminal transmits data through the antenna panel indicated by the indication information, and other antenna panels of the user terminal do not participate, thereby reducing power consumption of the user terminal.

In the embodiments of the present disclosure, the user terminal can use the antenna panel used for transmission to perform uplink data transmission and downlink data transmission, that is, both the uplink data transmission and the downlink data transmission of the user terminal can be performed through the same antenna panel.

In some embodiments, when the number of antenna panels corresponding to the user terminal is large, or the size of the bearer resources used to carry the measurement information is limited, a following situation may occur: the bearer resources used to carry the measurement information cannot completely carry the downlink measurement results corresponding to all the antenna panels corresponding to the user terminal.

Specifically, when the situation described above occurs, the user terminal may determine a number of downlink measurement results corresponding to the antenna panels to be reported to the base station according to the size of the bearer resources. After determining the number M of downlink measurement results to be reported to the base station, only downlink measurement results corresponding to first M antenna panels with a highest priority may be reported to the base station, where 1≤M≤N.

For example, the number of antenna panels corresponding to the user terminal N is equal to 4, and the bearer resources can only carry downlink measurement results corresponding to two antenna panels. In this case, the user terminal only reports downlink measurement results corresponding to first two antenna panels with the highest priority to the base station.

The antenna panel determination method provided in the foregoing embodiments of the present disclosure will be described in detail in conjunction with examples.

As an example, the user terminal reports downlink measurement results corresponding to each antenna panel to the base station in a following order: {CSI_1, CSI_2, . . . , CSI_N}, where CSI_1 is a downlink measurement result corresponding to an antenna panel 1 of the user terminal, CSI_2 is a downlink measurement result corresponding to an antenna panel 2 of the user terminal, and by analogy, CSI_N is a downlink measurement result corresponding to an antenna panel N of the user terminal.

Specifically, a downlink measurement result corresponding to any antenna panel may include one or more Signal to Interference plus Noise Ratio (SINR) values or Reference Signal Received Power (RSRP) values.

The base station performs an uplink training for each antenna panel. In the uplink training, the base station may use the preset mapping relationship between the SRS source set IDs and the antenna panels, for example: panel ID=(SRS source set ID) mod N, so as to get the uplink measurement results corresponding to the N antenna panels. The base station determines the antenna panel that is to be used for transmission by the user terminal based on the uplink measurement results and the downlink measurement results corresponding to the N antenna panels. According to the identifier of the antenna panel used for transmission, the base station determines the SRS source set ID corresponding to the identifier.

The base station sends the indication information to the user terminal through a DCI, and the indication information carries the SRS source set ID. After receiving the indication information, the user terminal obtains the SRS source set ID from the indication information, and determines the antenna panel used for transmission according to the formula: panel ID=(SRS source set ID) mod N.

Figure 2:
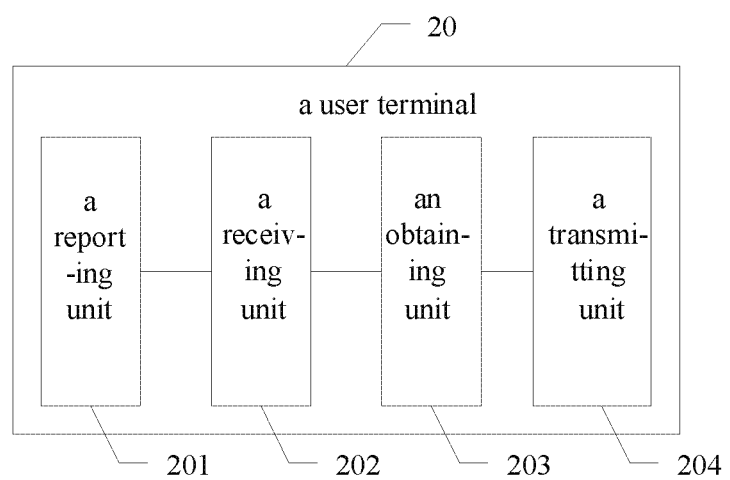
FIG. 2 schematically illustrates a structural diagram of a user terminal according to an embodiment.

FIG. 2 schematically illustrates a structural diagram of a user terminal 20 according to an embodiment. Referring to FIG. 2, the user terminal 20 includes: a reporting unit 201, a receiving unit 202, an obtaining unit 203, and a transmitting unit 204.

Specifically, the reporting unit 201 is adapted to report a measurement information to a base station, wherein the measurement information includes downlink measurement results corresponding to N antenna panels, where N is a total number of configured antenna panels, and N≥2.

The receiving unit 202 is adapted to receive an indication information sent by the base station, where the indication information is obtained by the base station according to the measurement information and uplink measurement results.

The obtaining unit 203 is adapted to obtain, from the indication information, an antenna panel used for transmission and indicated by the base station.

The transmitting unit 204 is adapted to use the antenna panel used for transmission to perform transmission.

In some embodiments, the obtaining unit 203 is adapted to obtain a sounding reference signal resource set identifier from the indication information and to determine the antenna panel used for transmission and indicated by the base station according to the sounding reference signal resource set identifier.

In some embodiments, the obtaining unit 203 is adapted to determine the antenna panel used for transmission and indicated by the base station according to a following formula: panel ID=(SRS source set ID) mod N, wherein the panel ID is an identifier of the antenna panel used for transmission and indicated by the base station, and the SRS source set ID is the sounding reference signal resource set identifier.

In some embodiments, the reporting unit 201 is further adapted to, when a size of the measurement information exceeds a size of a bearer resource set correspondingly, determine downlink measurement results corresponding to first M antenna panels with a highest priority according to the size of the bearer resource and report the downlink measurement results corresponding to the first M antenna panels to the base station.

In some embodiments, in the measurement information, the downlink measurement results corresponding to the N antenna panels are arranged in a preset order.

In some embodiments, in the measurement information, antenna panels corresponding to message 1 or message 3 are arranged in a first place of the downlink measurement results corresponding to the N antenna panels.

In an embodiment of the present disclosure, a computer readable storage medium having computer instructions stored therein, wherein the computer readable storage medium is a non-volatile storage medium or a non-transitory storage medium, and once the computer instructions are executed, the above antenna panel determination method is performed.

In an embodiment of the present disclosure, another user terminal including a memory and a processor is provided, wherein the memory has computer instructions stored therein, and when the processor executes the computer instructions, the above antenna panel determination method is performed.

Those skilled in the art can understand that all or part of the steps of the methods provided in the embodiments of the present disclosure can be performed by computer instructions in conjunction with relevant hardware. The computer instructions may be stored in a computer readable storage medium, which includes: a Read Only Memory (ROM), a Random Access Memory (RAM), a magnetic disk, an optical disk or the like.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An antenna panel determination method, comprising:
   reporting a measurement information to a base station, wherein the measurement information comprises downlink measurement results corresponding to N antenna panels, where N is a total number of configured antenna panels, and N≥2;
   receiving an indication information sent by the base station, where the indication information is obtained by the base station according to the measurement information and uplink measurement results;
   obtaining, from the indication information, an antenna panel that is used for transmission and indicated by the base station; and
   using the antenna panel that is used for transmission and indicated by the base station to perform transmission;
   wherein said reporting the measurement information to the base station comprises: based on that a size of the measurement information exceeds a size of a bearer resource set correspondingly, determining downlink measurement results corresponding to first M antenna panels with a highest priority according to the size of the bearer resource and reporting the downlink measurement results corresponding to the first M antenna panels to the base station.

2. The antenna panel determination method according to claim 1, wherein obtaining, from the indication information, an antenna panel used for transmission and indicated by the base station comprises:
   obtaining a sounding reference signal resource set identifier from the indication information; and
   determining the antenna panel used for transmission and indicated by the base station according to the sounding reference signal resource set identifier.

3. The antenna panel determination method according to claim 2, wherein determining the antenna panel used for transmission and indicated by the base station according to the sounding reference signal resource set identifier comprises:
   determining the antenna panel used for transmission and indicated by the base station according to a following formula:

panel ID=(SRS source set ID)mod $N$;

wherein, the panel ID is an identifier of the antenna panel used for transmission and indicated by the base station, and the SRS source set ID is the sounding reference signal resource set identifier.

4. The antenna panel determination method according to claim 1, wherein in the measurement information, the downlink measurement results corresponding to the N antenna panels are arranged in a preset order.

5. The antenna panel determination method according to claim 4, wherein in the measurement information, antenna panels corresponding to message 1 or message 3 are arranged in a first place of the downlink measurement results corresponding to the N antenna panels.

6. A computer readable storage medium having computer instructions stored therein, wherein the computer readable storage medium is a non-volatile storage medium or a non-transitory storage medium, and once the computer instructions are executed, the method according to claim 1 is performed.

7. A user terminal, comprising:
   a reporting circuitry, adapted to report a measurement information to a base station, wherein the measurement information comprises downlink measurement results corresponding to N antenna panels, where N is a total number of configured antenna panels, and N≥2;
   a receiving circuitry, adapted to receive an indication information sent by the base station, where the indication information is obtained by the base station according to the measurement information and uplink measurement results;
   an obtaining circuitry, adapted to obtain, from the indication information, an antenna panel used for transmission and indicated by the base station; and
   a transmitting circuitry, adapted to use the antenna panel used for transmission to perform transmission;
   wherein the reporting circuitry is further adapted to: based on that a size of the measurement information exceeds a size of a bearer resource set correspondingly, determine downlink measurement results corresponding to first M antenna panels with a highest priority according to the size of the bearer resource and report the downlink measurement results corresponding to the first M antenna panels to the base station.

8. The user terminal according to claim 7, wherein the obtaining circuitry is adapted to obtain a sounding reference signal resource set identifier from the indication information, and to determine the antenna panel used for transmission and indicated by the base station according to the sounding reference signal resource set identifier.

9. The user terminal according to claim 8, wherein the obtaining circuitry is adapted to determine the antenna panel used for transmission and indicated by the base station according to a following formula: panel ID=(SRS source set ID) mod N, wherein the panel ID is an identifier of the antenna panel used for transmission and indicated by the base station, and the SRS source set ID is the sounding reference signal resource set identifier.

10. The user terminal according to claim 7, wherein in the measurement information, the downlink measurement results corresponding to the N antenna panels are arranged in a preset order.

11. The user terminal according to claim 10, wherein in the measurement information, antenna panels corresponding to message 1 or message 3 are arranged in a first place of the downlink measurement results corresponding to the N antenna panels.

12. A user terminal having a memory and a processor, wherein the memory stores one or more programs, the one or more programs comprising computer instructions, which, when executed by the processor, cause the processor to:
   report a measurement information to a base station, wherein the measurement information comprises downlink measurement results corresponding to N antenna panels, where N is a total number of configured antenna panels, and N≥2;
   receive an indication information sent by the base station, where the indication information is obtained by the base station according to the measurement information and uplink measurement results;
   obtain, from the indication information, an antenna panel that is used for transmission and indicated by the base station; and
   use the antenna panel that is used for transmission and indicated by the base station to perform transmission;
   wherein said reporting the measurement information to the base station comprises: based on that a size of the measurement information exceeds a size of a bearer resource set correspondingly, determining downlink measurement results corresponding to first M antenna panels with a highest priority according to the size of the bearer resource and reporting the downlink measurement results corresponding to the first M antenna panels to the base station.

* * * * *